United States Patent [19]

Kitamura

[11] Patent Number: 4,771,471
[45] Date of Patent: Sep. 13, 1988

[54] SMOOTHING METHOD FOR BINARY-CODED IMAGE DATA AND APPARATUS THEREFOR

[75] Inventor: Hideaki Kitamura, Osaka, Japan

[73] Assignee: Dainippon Screen Mfg. Co., Ltd., Kyoto, Japan

[21] Appl. No.: 814,711

[22] Filed: Dec. 30, 1985

[30] Foreign Application Priority Data

Mar. 7, 1985 [JP] Japan .................. 60-43601

[51] Int. Cl.$^4$ .............................. G06K 9/00
[52] U.S. Cl. .................... 382/41; 358/166; 382/47
[58] Field of Search ............ 382/41, 44, 47, 54; 358/166, 140

[56] References Cited

U.S. PATENT DOCUMENTS

| | | | |
|---|---|---|---|
| 4,127,873 | 11/1978 | Katagi | 358/166 |
| 4,323,974 | 4/1982 | Sekigawa | 382/54 |
| 4,356,555 | 10/1982 | Ejiri et al. | 382/54 |
| 4,360,883 | 11/1982 | Ejiri et al. | 382/54 |
| 4,437,122 | 3/1984 | Walsh et al. | 382/54 |
| 4,564,865 | 1/1986 | Yamada | 382/47 |

Primary Examiner—Leo H. Boudreau
Attorney, Agent, or Firm—Rosen, Dainow & Jacobs

[57] ABSTRACT

Disclosed herein is a method and apparatus for processing binary-coded image data. A peripheral picture element region of a predetermined size is set up around a target picture element which is to be processed. Logical windows are established around their corresponding divided picture elements which have been obtained by dividing the target picture element into n×n pieces. In the respective logical windows, the areas of data regions "1" divided in accordance with the logical values are determined. The areas are compared with a predetermined value to obtain comparison results. Predetermined logical values are again given to the data on the divided picture elements located centrally in their corresponding logical windows in accordance with their corresponding comparison results. Data on the above-processed divided picture elements are then output upon outputting data on the target picture element. Owing to the establishment of the logical windows, the present invention has facilitated the preparation of high-resolution data useful in a smoothening operation which takes peripheral picture elements into consideration.

5 Claims, 8 Drawing Sheets

FIG. 3

| $e_{11}$ | | | | $a_{33}$ | |
|---|---|---|---|---|---|
| | $S_{11}$ 186 | $S_{12}$ 201 | $S_{13}$ 216 | $S_{14}$ 231 | $S_{15}$ 246 |
| | $S_{21}$ 207 | $S_{22}$ 222 | $S_{23}$ 237 | $S_{24}$ 252 | $S_{25}$ 267 |
| | $S_{31}$ 228 | $S_{32}$ 243 | $S_{33}$ 258 | $S_{34}$ 273 | $S_{35}$ 288 |
| | $S_{41}$ 249 | $S_{42}$ 264 | $S_{43}$ 279 | $S_{44}$ 294 | $S_{45}$ 309 |
| | $S_{51}$ 270 | $S_{52}$ 285 | $S_{53}$ 300 | $S_{54}$ 315 | $S_{55}$ 330 |

| 0 | 0 | 0 | 1 | 1 |
|---|---|---|---|---|
| 0 | 1 | 1 | 1 | 1 |
| 1 | 1 | 1 | 1 | 1 |
| 1 | 1 | 1 | 1 | 1 |
| 1 | 1 | 1 | 1 | 1 |

FIG. 7

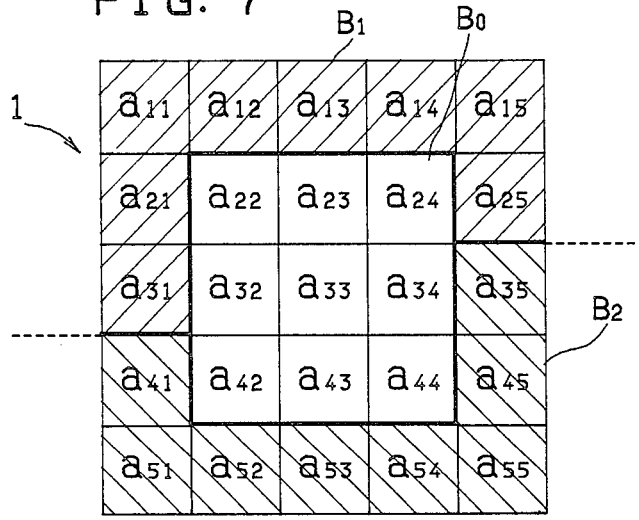

FIG. 8

| $S_{11}$ $= S_{11}(B_0)$ $+ S_{11}(B_1)$ $+ S_{11}(B_2)$ | $S_{12}$ $= S_{12}(B_0)$ $+ S_{12}(B_1)$ $+ S_{12}(B_2)$ | $S_{13}$ $= S_{13}(B_0)$ $+ S_{13}(B_1)$ $+ S_{13}(B_2)$ | $S_{14}$ $= S_{14}(B_0)$ $+ S_{14}(B_1)$ $+ S_{14}(B_2)$ | $S_{15}$ $= S_{15}(B_0)$ $+ S_{15}(B_1)$ $+ S_{15}(B_2)$ |
|---|---|---|---|---|
| $S_{21}$ $= S_{21}(B_0)$ $+ S_{21}(B_1)$ $+ S_{21}(B_2)$ | $S_{22}$ $= S_{22}(B_0)$ $+ S_{22}(B_1)$ $+ S_{22}(B_2)$ | $S_{23}$ $= S_{23}(B_0)$ $+ S_{23}(B_1)$ $+ S_{23}(B_2)$ | $S_{24}$ $= S_{24}(B_0)$ $+ S_{24}(B_1)$ $+ S_{24}(B_2)$ | $S_{25}$ $= S_{25}(B_0)$ $+ S_{25}(B_1)$ $+ S_{25}(B_2)$ |
| $S_{31}$ $= S_{31}(B_0)$ $+ S_{31}(B_1)$ $+ S_{31}(B_2)$ | $S_{32}$ $= S_{32}(B_0)$ $+ S_{32}(B_1)$ $+ S_{32}(B_2)$ | $S_{33}$ $= S_{33}(B_0)$ $+ S_{33}(B_1)$ $+ S_{33}(B_2)$ | $S_{34}$ $= S_{34}(B_0)$ $+ S_{34}(B_1)$ $+ S_{34}(B_2)$ | $S_{35}$ $= S_{35}(B_0)$ $+ S_{35}(B_1)$ $+ S_{35}(B_2)$ |
| $S_{41}$ $= S_{41}(B_0)$ $+ S_{41}(B_1)$ $+ S_{41}(B_2)$ | $S_{42}$ $= S_{42}(B_0)$ $+ S_{42}(B_1)$ $+ S_{42}(B_2)$ | $S_{43}$ $= S_{43}(B_0)$ $+ S_{43}(B_1)$ $+ S_{43}(B_2)$ | $S_{44}$ $= S_{44}(B_0)$ $+ S_{44}(B_1)$ $+ S_{44}(B_2)$ | $S_{45}$ $= S_{45}(B_0)$ $+ S_{45}(B_1)$ $+ S_{45}(B_2)$ |
| $S_{51}$ $= S_{51}(B_0)$ $+ S_{51}(B_1)$ $+ S_{51}(B_2)$ | $S_{52}$ $= S_{52}(B_0)$ $+ S_{52}(B_1)$ $+ S_{52}(B_2)$ | $S_{53}$ $= S_{53}(B_0)$ $+ S_{53}(B_1)$ $+ S_{53}(B_2)$ | $S_{54}$ $= S_{54}(B_0)$ $+ S_{54}(B_1)$ $+ S_{54}(B_2)$ | $S_{55}$ $= S_{55}(B_0)$ $+ S_{55}(B_1)$ $+ S_{55}(B_2)$ |

SMOOTHING METHOD FOR BINARY-CODED IMAGE DATA AND APPARATUS THEREFOR

BACKGROUND OF THE INVENTION

1. Field of the Invention:

This invention relates to a processing method of binary-coded image data which represent a mask in terms of binary-coded data, and especially to a method for smoothing mask boundaries by converting picture element data of a low resolution into their corresponding high resolution data and an apparatus suitable for use in the practice of the method.

2. Description of the Prior Art:

When binary-coded image data are output and then displayed or recorded, a stair-like zig-zag boundary appears as shown in FIG. 11(a) where the boundary between logical values "1" and logical values "0" is oblique. In FIG. 11(a), each piece of the picture element data is shown by a single piece of square and the squares of logical value "0" are shown as plain squares and the squares of logical value "1" are indicated by hatchings. A variety of methods have heretofore been proposed to make such zig-zag boundaries less noticeable.

As one of such prior art proposals, picture element data are divided and the thus-divided picture elements are again binary-coded in accordance with their respective peripheral picture data to smoothen the boundary as illustrated in FIG. 11(b). This method is disclosed for example in Japanese Patent Publication No. 30573/1983. It may also be contemplated to perform further division of the above-divided picture element data as shown in FIG. 11(c).

The above patent publication, it is disclosed to employ an ROM, to which pattern data on peripheral picture elements are input, so as to obtain data on divided picture elements. However, it neither discloses nor suggests anything how to prepare the data on the divided picture elements for their writing in the ROM.

It appears that as is routinely practiced, the patterns of the peripheral picture elements are empirically classified into groups and data patterns of the divided picture elements are manually determined one by one in accordance with the thus-classified patterns of the peripheral picture elements.

When picture elements which are to be processed are divided into $3\times3$ or $5\times5$ in accordance with the peripheral picture elements of $3\times3$ pieces as depicted in FIGS. 11(b) or 11(c), 512 data patterns can be contemplated for the resulting divided picture elements. These data patterns may still be manually determined with ease.

However, the above-mentioned manual approach is practically impossible to perform smoothening while taking the peripheral picture elements of a broader region into consideration so as to improve the smoothness of the resultant picture quality. If one wants to make an improvement in resolution, for example, to peripheral picture elements of $5\times5$ pieces (namely, the picture element which is to be processed is divided into $5\times5$ pieces), such a huge number of data patterns as many as $2^{25}$ ($=33,554,432$) are required for the divided picture elements.

For the single piece of central data pattern of the peripheral picture elements of $5\times5$ pieces, it is indispensable to use divided picture element data of $2^{25}\times5\times5$ pieces in total when the central data pattern is displayed in $5\times5$ pieces. If one tries to carry out the above processing by means of an ROM, about 3,200 memory chips of 256 kilobits each are required. This is certainly impractical from the economical standpoint too.

SUMMARY OF THE INVENTION

An object of this invention is to solve the above-mentioned problems, namely, the drawbacks that enormous time and work are required to prepare data of an improved resolution (hereinafter called "high-resolution data") on the basis of the peripheral picture elements in a broad region, and at the same time to materialize the above-mentioned improvement in resolution at an economically low cost.

Specifically speaking, the object which has to be achieved first of all for the solution of the above-mentioned problem is to make it possible to obtain high-resolution data with ease.

Secondly, it is also necessary to meet, without any problems or inconvenience, smoothening which takes the peripheral picture elements of a broad region into consideration.

Thirdly, the smoothening has to be performed at a high speed, namely, on the real-time basis.

Fourthly, the smoothening can be performed without need for an large circuitry.

As the fifth requirement, the present invention is supposed to have a wide range of applicability so that it can be applied for the processing of general binary-coded images, namely, irrespective of their output means such as printed recording or CRT display.

In one aspect of this invention, there is thus provided a method for processing binary-coded image data, including processing one of picture element data, which make up the binary-coded image data, in accordance with peripheral picture element data of said one picture element data and outputting the thus-processed picture element data as data on a plurality of divided picture elements to an output unit, which comprises:

setting up a peripheral picture element region of a predetermined size around a target picture element which is to be processed;

establishing logical windows around their corresponding divided picture elements which have been obtained by dividing the target picture element into $n\times n$ pieces, said logical windows having a preestablished size and falling within the peripheral picture element region;

determining the areas of data regions "1" divided in accordance with the logical values in the respective logical windows;

comparing the areas with a predetermined value "0" or "1" to obtain comparison results;

giving predetermined logical values again to the data on the divided picture elements located centrally in their corresponding logical windows in accordance with their corresponding comparison results; and outputting data on the above-processed divided picture elements upon outputting data on the target picture element.

In another aspect of this invention there is also provided an apparatus for smoothening binary-coded image data by processing one of picture element data, which make up the binary-coded image data, in accordance with peripheral picture element data of said one picture element data and outputting the thus-processed picture element data as data on a plurality of divided picture elements to an output unit, said apparatus including memory means capable of receiving data on a target picture element to be processed and data on peripheral picture elements around the target picture element for obtaining the data on the plurality of divided picture elements, which comprises:

means for setting up a peripheral picture element region of a predetermined size around the target picture element which is to be processed, establishing logical windows around their corresponding divided picture elements which have been obtained by dividing the target picture element into n×n pieces, said logical windows having a preestablished size and falling within the peripheral picture element region, dividing the picture element region of the predetermined size into a suitable number of blocks, and determining the areas of data regions "1" divided in accordance with the logical values in the respective logical windows in the respective blocks;

means for storing the respective areas;

means for adding the areas output from the storage means; and means for comparing the thus-added value with a predetermined value to obtain comparison results and giving predetermined logical values again to the data on the divided picture elements located centrally in their corresponding logical windows in accordance with their corresponding comparison results, thereby processing all logical patterns, which the peripheral picture element region and the central picture element region may take, so as to output the divided picture element data obtained from the means which is adapted to give the predetermined logical values.

Owing to the establishment of the logical windows, the present invention has facilitated the preparation of high-resolution data useful in a smoothening operation which takes peripheral picture elements into consideration.

The present invention can also meet with ease changes in the size of peripheral elements which are taken into consideration, even if the region of peripheral elements is enlarged.

Namely, it has conventionally been required to rely upon enormous work, which has to be done in accordance with operator's judgements, to improve the resolution of an image o the basis of its peripheral picture elements.

In the present invention, the logical windows are established and the data patterns of divided picture elements are then determined with reference to the peripheral picture elements. The establishment of the logical widows has made it possible to obtain high-resolution data by means of a computer or the like without relying upon manual means.

Since data are determined by a computer and no human judgement is thus involved upon determination of the data, operators' experiences are unnecessary and high-resolution images of uniform quality can be obtained.

This invention enables to use an RAM or ROM which has a considerably-reduced capacity, leading to simplified circuitry.

This invention can be applied widely and readily to general processing of binary-coded data which require smoothening.

The above and other objects, features and advantages of the present invention will become apparent from the following description and the appended claims, taken in conjunction with the accompanying drawings.

BRIEF DESCRIPTION OF THE DRAWINGS

In the accompanying drawings:

FIG. 3 shows counted values $S_{ij}$ collectively;

FIG. 4 depicts the pattern of the corresponding divided picture elements;

FIG. 7 shows illustrative division of the region of peripheral picture elements of a prescribed size;

FIG. 8 diagrammatically illustrates how to determine counted values $S_{ij}$;

DETAILED DESCRIPTION OF THE INVENTION AND PREFERRED EMBODIMENTS

The present invention will hereinafter be described specifically on the basis of one embodiment thereof.

Figure 1:
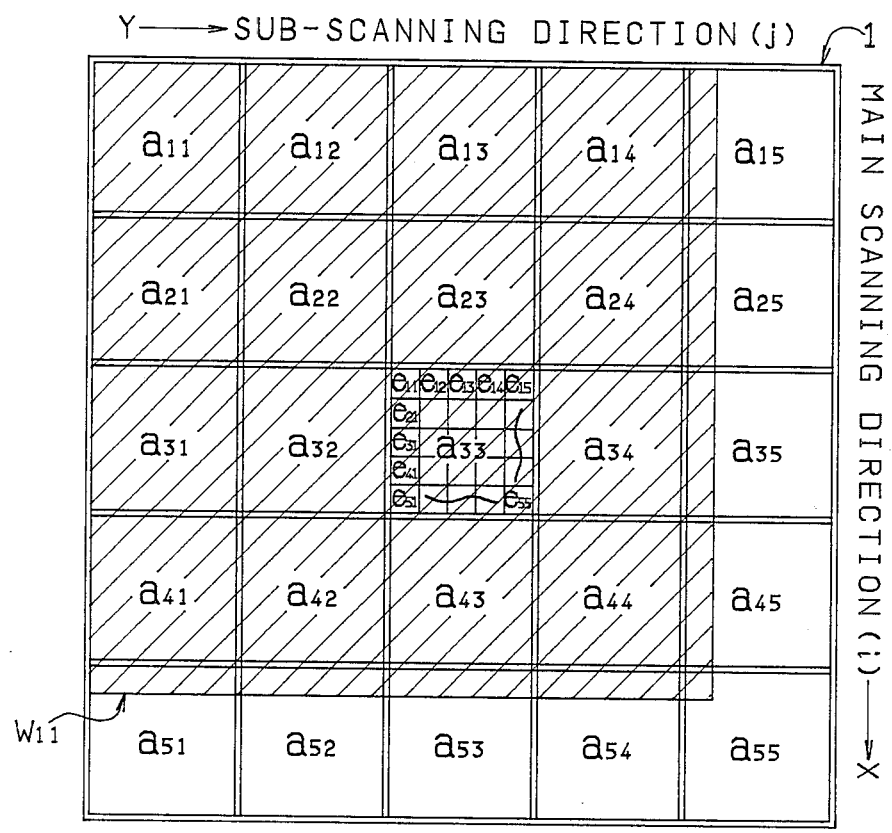
FIG. 1 is a schematic illustration of a picture element region and logical window according to one embodiment of this invention.

The embodiment pertains to smoothening which takes peripheral picture elements in a wide region into consideration. As depicted in FIG. 1, there are established a picture element region 1 which consists of 5×5 picture elements $a_{ij}$ (i=1−5; j=1−5). In an actual data processing operation, picture element data on the respective picture elements $a_{ij}$ correspond individually to a high level signal "H" (corresponding to the logical value "1") or a low level signal "L" (corresponding to the logical value "0"). The high-level signals and low-level signals are obtained, for example, by successive scanning in X- and Y-directions.

Let's now suppose that the central picture element $a_{33}$ in the picture element region 1 is a picture element to be processed for the improvement of its resolution. First of all, the picture element $a_{33}$ is divided into 5×5 to establish divided picture elements $e_{ij}$ (i=1−5; j=1−5).

Then, a square logical window $W_{ij}$ is established around each of the divided elements $e_{ij}$ with the latter at the center. Each side of the logical window is 21 units long wherein each unit is equal to the unit length of the divided picture elements. In FIG. 1, a logical window $W_{11}$ established around the divided picture element $e_{11}$ is indicated by hatchings.

Figure 2:
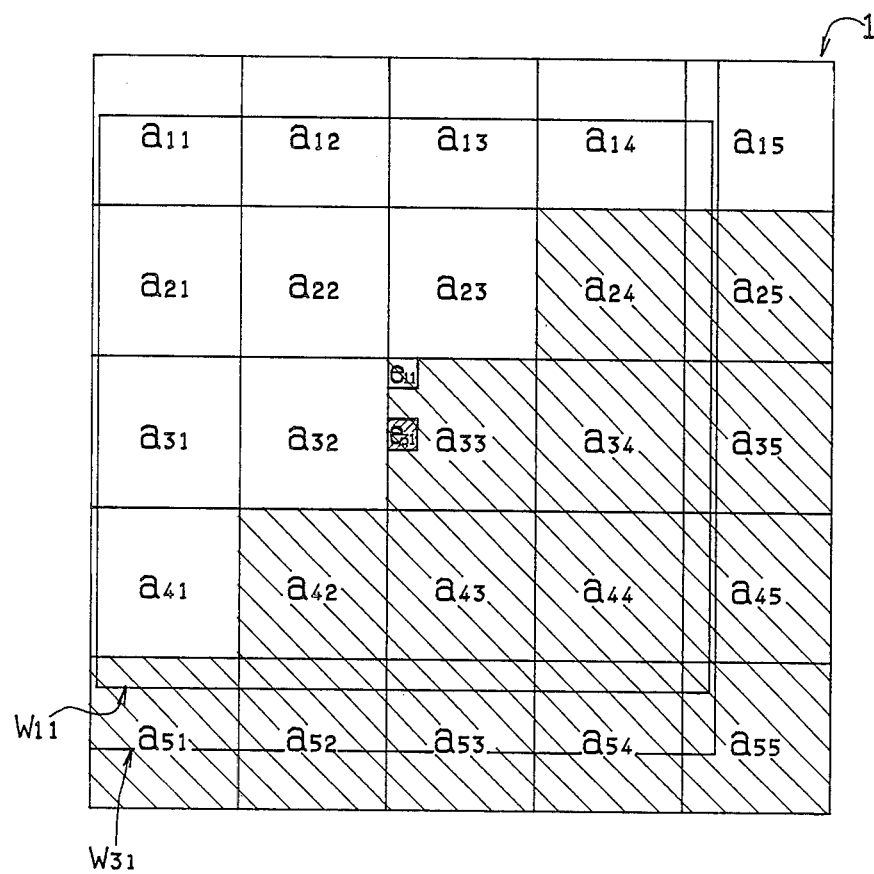
FIG. 2 is an explanatory illustration of an exemplary pattern of a picture element region and a method for obtaining high-resolution data.

The picture element $a_{ij}$ takes either one of the logical values "1" and "0". There are thus $2^{25}$ patterns, one of which is shown in FIG. 2 where picture elements having the logical value "1" are indicated by hatchings. The logical window $W_{ij}$ internally defines two regions $W_{ij}(1)$ and $W_{ij}(0)$ which are distinguished from each other depending on their logical values, i.e, whether they take the logical value "1" or the logical value "0". Areas $S_{ij}(1)$ and $S_{ij}(0)$ can be defined corresponding respectively to the regions $W_{ij}(1)$ and $W_{ij}(0)$.

The area $S_{ij}(1)$ (hereinafter abbreviated as $S_{ij}$) can be expressed in terms of the total number of the logical values "1" by supposing that each divided picture element is 1 unit. Namely, let's suppose that the picture elements $a_{ij}$ inclusive of the picture element $a_{33}$ are each divided into 5×5. The area $S_{ij}$ can be determined by giving the logical value of each picture element to the corresponding divided picture elements and then counting the number of divided picture elements which take the logical value "1". In the case of the logical window $W_{11}$ indicated by way of example around the divided picture element $e_{11}$ in FIG. 2, $S_{11}=186$ [$S_{11}(0)=255$].

$S_{ij}$ may also be determined with respect to another logical window $W_{ij}$ in the same manner. The resultant $S_{ij}$ is shown in FIG. 3. These numerically-coded indexes serve as objective indicea which show how much amicability the individual divided picture elements $e_i$ have to the region of "1" in relation to their peripheral picture elements. The greater the value, the stronger the amicability to "1".

Hence, by setting up a threshold value SL and comparing it with each $S_{ij}$, new logical values are respectively determined for the divided picture elements $e_{ij}$. Namely, let's establish the following conditions:

When $S_{ij} > SL$, $e_{ij} = $ "1"
When $S_{ij} < SL$, $e_{ij} = $ "0"

Let's now assume by way of example that the threshold value is 220.5 (SL=220.5) for each of the values in FIG. 3. The divided picture elements $e_{11}$-$e_{13}$ and $e_{21}$ take "0" while the remaining divided picture elements take "1". This situation is diagrammatically shown in FIG. 4.

Figure 11:
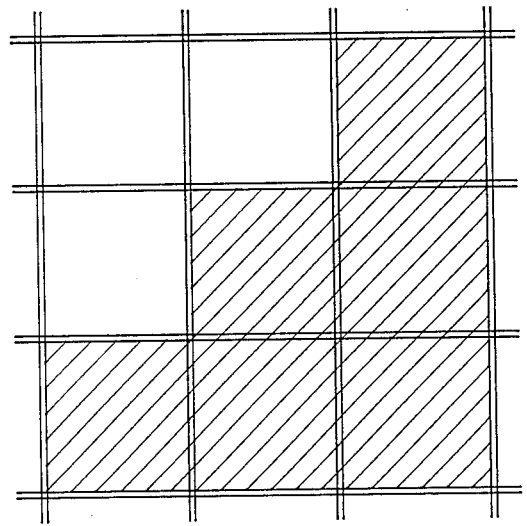
FIG. 11(a) is an explanatory illustration of the zig-zag boundary in low-resolution picture elements.
FIGS. 11(b) and 11(c) illustrate exemplary high-resolution picture elements which may be obtained in accordance with conventional methods.
Figure 11:
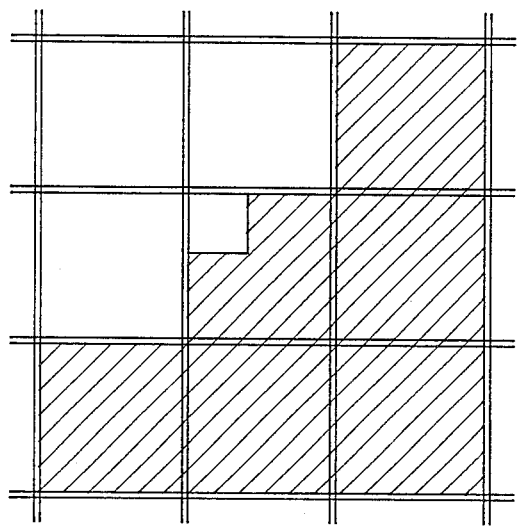
Figure 11:
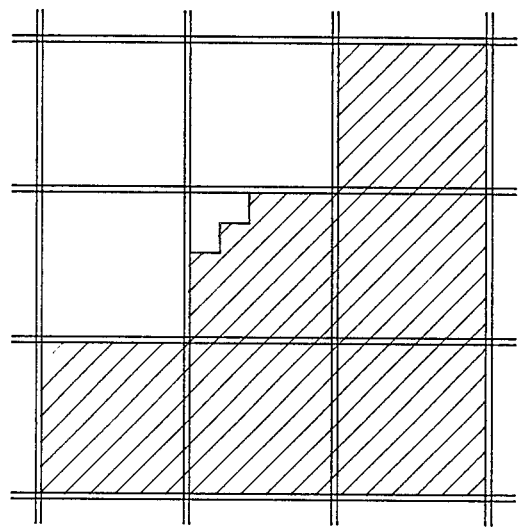

Upon comparison of FIG. 11(c) with FIG. 4, it is appreciated that $e_{13}$ has been changed. This change has been caused to occur since the picture element $a_{15}$ is "0". Namely, the smoothness has been improved because the prescribed peripheral picture elements have been increased in number.

As envisaged with reference to FIGS. 2 and 4, the logical patterns of the divided picture elements $e_{11}$-$e_{55}$ can be collectively determined relative to the logical patterns of the picture elements $a_{11}$-$a_{55}$ which make up the picture element region 1 once the value SL is set up.

Figure 5:
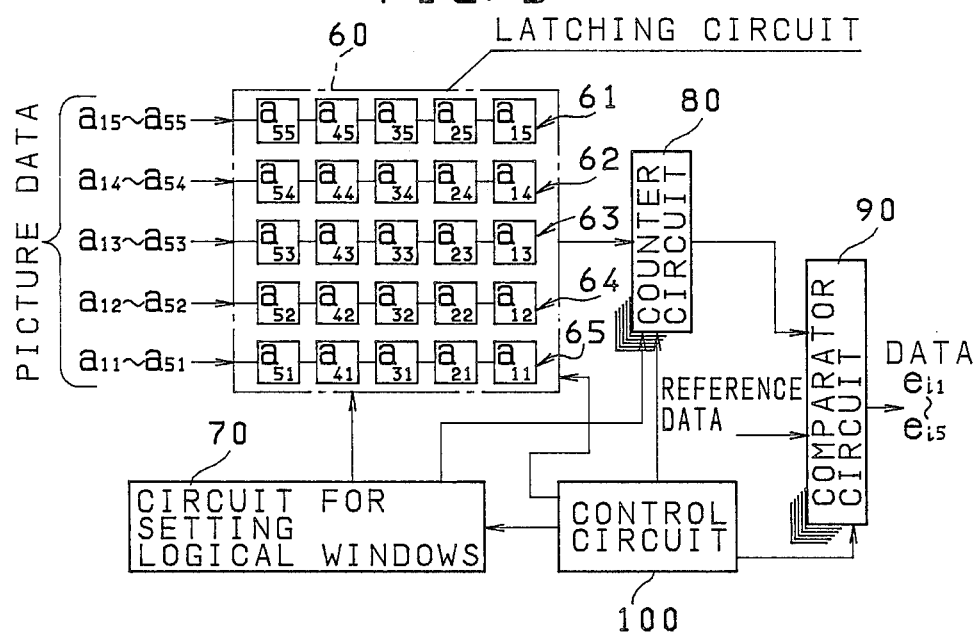
FIG. 5 is a block diagram of an electronic circuit in the one embodiment of this invention.

FIG. 5 illustrate an exemplary circuit diagram of an apparatus of this invention.

It has been known how to arrange image data in the pattern of $a_{11}$-$a_{51}$, ..., $a_{15}$-$a_{55}$. This is not the object of this invention and its detailed description is hence omitted here (see, for example, Japanese Patent Laid-Open No. 8140/1981).

Numeral 60 indicates a latching circuit to which binary-coded image data are input. The latching circuit 60 is, for example, composed of five shift registers 61-65. Designated at numeral 70 is a circuit which is adapted to establish a logical window for data latched in the latch circuit 60.

A counter circuit 80 is provided with 5 circuits which are arranged in parallel to one another. Within a data region where the logical window has been established, the counter circuit 80 counts the number of logical values "1" with respect to each of the divided picture element data. Output data of the counter circuit 80 are then fed to a comparator circuit 90 which is provided with 5 parallel circuits and has beforehand been input with reference data. A control circuit 100 sends clock and timing signals and other control signals to the respective circuits 60,70,80,90 to control them centrally.

In synchronization with a system clock, for example, a clock of 400 ns interval from the control circuit 100, picture element data $e_{i1}$-$e_{i5}$ the resolution of which has been improved to a high resolution are successively output from the comparator circuit 90. By repeating this operation five times, high-resolution data can be obtained with respect to the target picture element $a_{33}$.

Another embodiment will next be described with reference to FIG. 6.

As described above, the logical patterns of divided picture elements $e_{11}$-$e_{55}$ can be collectively determined relative to the logical patterns of the picture elements $a_{11}$-$a_{55}$ which make up the picture element region 1, provided that the size of the logical window W and the threshold value SL are set up. Accordingly, it is possible to determine in advance the patterns of corresponding divided picture elements for the logical patterns of $2^{25}$ kinds through an operation. This operation can be performed easily and promptly by making use of a computer 110.

Resultant data are written either directly or indirectly in a memory 120. This memory 120 permits high-speed access, for example, is of 100-400 ns access time. The term "directly" as used herein means that the memory and the computer, which performs the operation, are connected directly to each other and results of the operation are written while using the logical pattern of $a_{11}$ ... $a_{55}$ as an address. On the other hand, by the term "indirectly" as used herein is meant that results of the operation are temporarily output to a peripheral memory of large capacity, for example, to a magnetic tape or magnetic disk and subsequently written in the memory by means of a writing device.

The memory may be composed of either RAM or ROM. When it is composed of a RAM, the storage pattern may be changed at will in accordance with the objective of eac processing by using the size of the logical window W and threshold value SL as parameters.

So long as the logical window, threshold value and the like are constant, a ROM may be employed. Operation results are written in by a ROM writing device while using $a_{11}$ ... $a_{55}$ as an address. The ROM in which data on the divided picture element patterns have been written constitutes, as a hardware, a part of the processing apparatus.

When 25-bit data portions of the picture element data $a_{11}$-$a_{55}$ introduced in the latching circuit 60 or the like has been input to the RAM 120 via 25 address lines, 25-bit data portions of the divided picture element data $e_{11}$-$e_{55}$ corresponding to the logical patterns are output parallelly.

For example, in the case of FIGS. 2 and 4, upon input of an address "00000, 00011, 00111, 01111, 11111", divided picture element data "00011, 01111, 11111, 11111, 11111" are output with respect to the picture element $a_{33}$.

Figure 6:
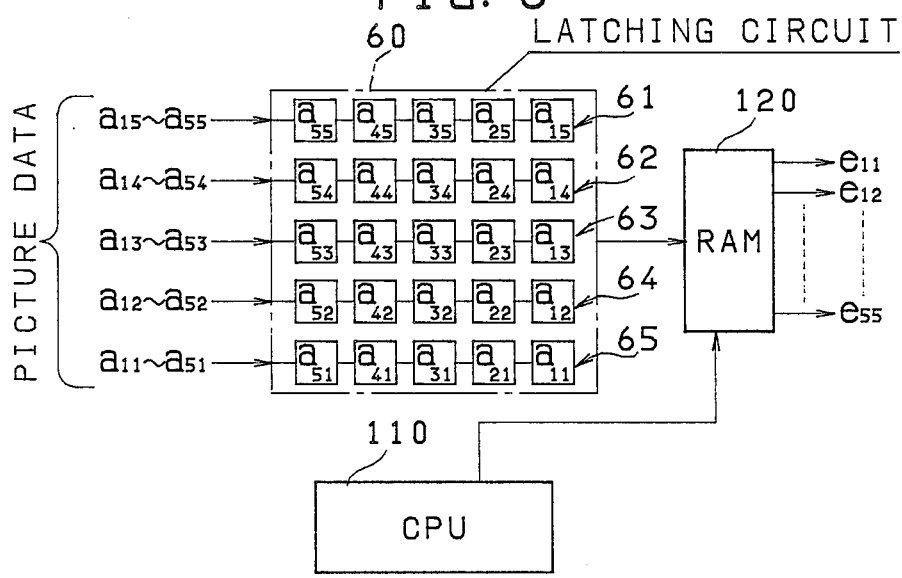
FIG. 6 is a block diagram of an electronic circuit in another example of this invention.

By the way, if one actually wants to make up the circuit 70 or 80 of FIG. 5 or the RAM (120) of FIG. 6, the volume of the circuit will become considerably large. In the case of the RAM 120, the memory capacity of $2^{25} \times 25$ bits is required as already mentioned above. From the economical viewpoint, it is required to simplify the structure.

A smoothening apparatus of a simplified structure, which makes use of an RAM, will next be described.

The basic concept for achieving the simplification includes the following three approaches:
(1) to divide the picture element region 1 into blocks;
(2) to employ a RAM device; and
(3) to perform the comparison between the counted values $S_{ij}$ with the threshold value by means of a circuit.

First of all, as illustrated in FIG. 7, the picture element region 1 is divided into three blocks $B_0$, $B_1$ and $B_2$. The blocks $B_0$, $B_1$ and $B_2$ are allotted respectively with the 9 picture elements $a_{22}$, $a_{32}$, $a_{42}$, $a_{23}$, $a_{33}$, $a_{43}$, $a_{24}$, $a_{34}$ and $a_{44}$; the 8 picture elements $a_{11}$, $a_{21}$, $a_{31}$, $a_{12}$, $a_{13}$, $a_{14}$, $a_{15}$ and $a_{25}$; and the 8 picture elements $a_{41}$, $a_{51}$, $a_{52}$, $a_{53}$, $a_{54}$, $a_{35}$, $a_{45}$ and $a_{55}$.

Assuming that the area which ordinary picture element data contribute to $S_{ij}$ in the block $B_0$ is $S_{ij(B0)}$, the area which ordinary picture element data contribute to $S_{ij}$ in the block $B_1$ is $S_{ij(B1)}$ and the area which ordinary picture element data contribute to $S_{ij}$ in the block $B_2$ is $S_{ij(B2)}$, the area $S_{ij}$ which takes the logical value "1" in the logical window $W_{ij}$ is expressed by the following equation.

$$S_{ij} = S_{ij(B0)} + S_{ij(B1)} + S_{ij(B2)} \qquad (1)$$

The above situation is illustrated in FIG. 8. Then, $S_{ij(B0)}$, $S_{ij(B1)}$ and $S_{ij(B2)}$ are stored in their corresponding RAMs.

By storing the areas in the RAMs, the processing can be performed at a faster speed compared with their counting by a discrete processing circuit (for example, the one shown in FIG. 5).

Figure 9:
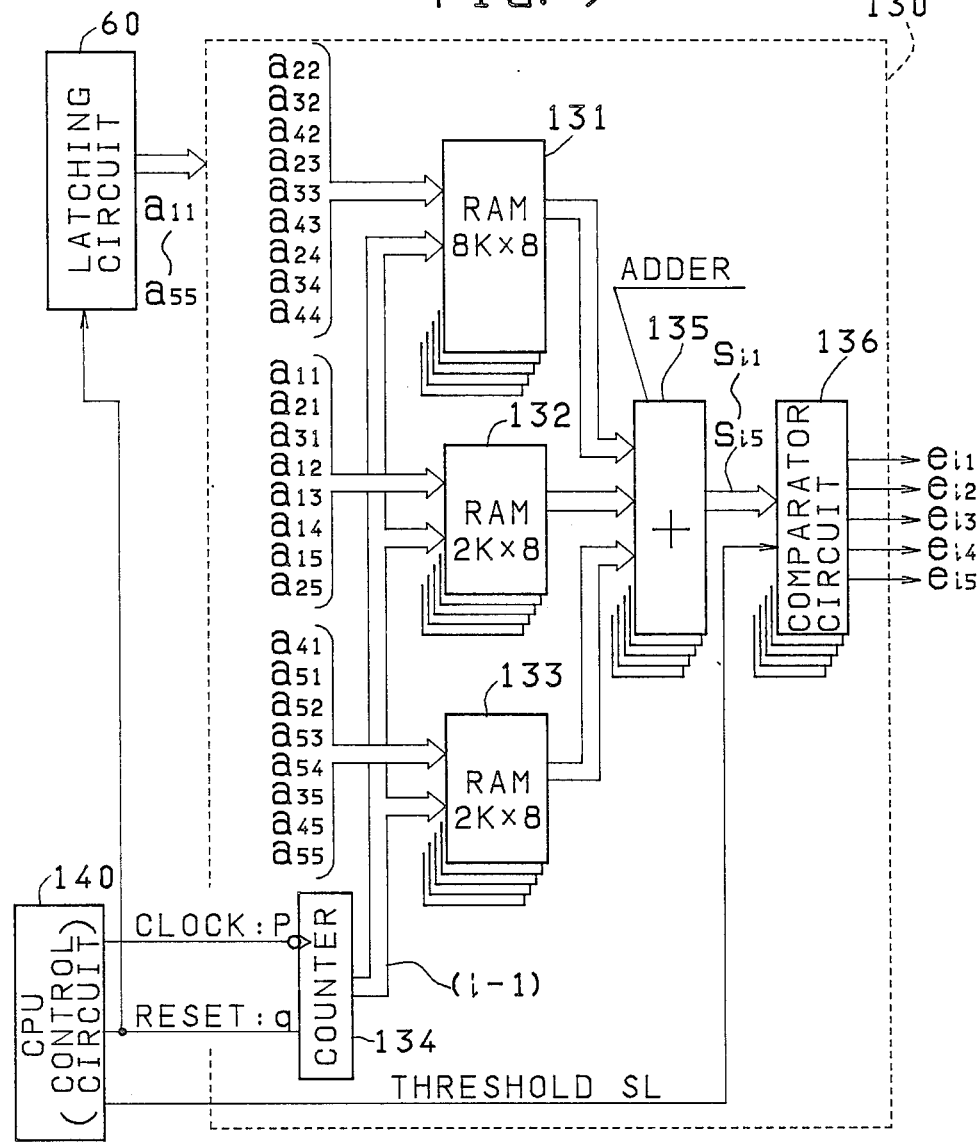
FIG. 9 is a block diagram of a simplified electronic circuit in a further example of this invention.

One embodiment of a smoothening apparatus corresponding to FIG. 5 or FIG. 6, which employ RAMs, is shown in FIG. 9.

The smoothening apparatus of FIG. 9 is composed of the same latching circuit 60 as that employed in FIG. 5 or 6, RAMs 131,132,133 each of which is constructed of 5 sets of random access memories, an adder 135 which is composed of 5 sets of adders, a counter 134 and a CPU/CONTROL circuit 140.

Using the CPU 140, $S_{ij(B0)}$, $S_{ij(B1)}$ and $S_{ij(B2)}$ are written in the RAM 131, RAM 132 and RAM 133 respectively. The thus-written values are subjected to the operation of the equation (1) in the adder 135, followed by output of $S_{i1}$, $S_{i2}$, $S_{i3}$, $S_{i4}$ and $S_{i5}$ from the corresponding adders 135.

Thereafter, the $S_{i1}$, $S_{i2}$, $S_{i3}$, $S_{i4}$ and $S_{i5}$ are compared with the reference data (the threshold value SL) in the 5 sets of their corresponding comparator circuits 136. After that, logical values $e_{i1}$, $e_{i2}$, $e_{i3}$, $e_{i4}$ and $e_{i5}$ are output from the 5 sets of comparator circuits 136 respectively. The output of the counter 134 becomes 0 ($0 = i - 1$) and the counter 134 outputs a counted value ($0 = i - 1$, namely, $i = 1$) in accordance with a clock signal whenever the logical values $e_{i1}$, $e_{i2}$, $e_{i3}$, $e_{i4}$ and $e_{i5}$ of the target picture elements are output. When the output of the counter 134 is 0, i corresponds to 1 and the logical values $e_{11}$, $e_{12}$, $e_{13}$, $e_{14}$ and $e_{15}$ are output from the comparator circuit 136. As the counting proceeds at the counter 134, $e_{21}$, $e_{22}$, $e_{23}$, $e_{24}$, $e_{25}$; ...; ...; $e_{51}$, $e_{52}$, $e_{53}$, $e_{54}$, $e_{55}$ are output.

A clock signal p for the counter 134 is, for example, a pulse of 400 ns period and a reset signal q is output at every fifth period. This reset signal q (a pulse of 2 μs period) serves as an image shift signal for the latching circuit 60. Namely, the time equivalent to the five periods ($i = 1-5$) of the clock signal p is required to obtain 25 bits of high-resolution data ($e_{11} - e_{55}$) on a single target picture element.

$S_{ij(B0)}$, $S_{ij(B1)}$ and $S_{ij(B2)}$ are respectively 225 ($= 25 \times 9$), 200 ($= 25 \times 8$) and 200 ($25 \times 8$) at the maximum. They may thus be displayed in 8 bits (maximum: 255). On the other hand, the addresses input to the RAMs 131,132,133 are of 12 bits, 11 bits and 11 bits respectively. As memory capacities, 5 memories of $4k \times 8$ bits, 5 memories of $2k \times 8$ bits and 5 memories of $2k \times 8$ bits are thus required respectively. Hence, it is only necessary to use 15 memory devices (each of $4k \times 8$ bits).

In FIG. 3, $S_{11} = 186$. Since $S_{11(B0)} = 150$, $S_{11(B1)} = 5$ and $S_{11(B2)} = 31$, the value of $S_{11}$ is consistent with what is determined from the equation (1).

When the logical size has a size of $21 \times 21$, all $S_{ij(B0)}$ have the same value. However, they take different values when the logical window is small.

The size of logical window may range from $21 \times 21$ to $3 \times 3$ in accordance with the number of divided picture elements, relative to $5 \times 5$ peripheral picture elements.

Figure 10:
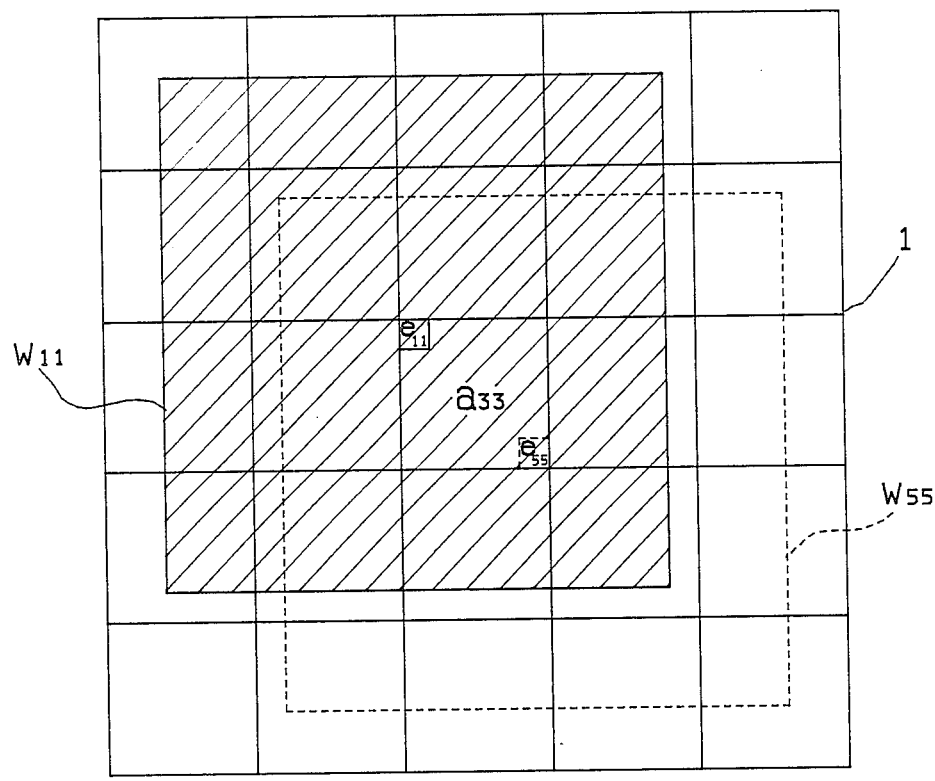
FIG. 10 is a schematic illustration similar to FIG. 1 except that the logical window has been rendered smaller.

FIG. 10 corresponds to FIG. 1 except that the logical window of FIG. 1 has been rendered smaller to $17 \times 17$. A logical window $W_{11}$ for the divided central picture element $e_{11}$ is indicated by solid lines while a logical window $W_{55}$ for the divided central picture element $e_{55}$ is designated by dashed lines.

The circuitry shown by way of example in FIG. 9 may be applied provided that the size of the logical window falls within the range of from $3 \times 3$ to $21 \times 21$ in terms of divided picture elements. So long as the size of the logical window is not greater than $21 \times 21$, the shape of the logical window may be freely chosen, for example, may be cruciform, radially-extending astral, circular, oval, etc. Namely, owing to the use of RAMs and CPU, calculation can be made on the basis of the shape and size of the logical window and calculation results can be written in the RAMs.

In the embodiments which have been described above, the sizes of the peripheral picture elements and divided picture elements were set at $5 \times 5$ and $5 \times 5$ respectively. To larger numbers of peripheral picture elements and divided picture elements, the method and apparatus of this invention are also applicable provided that the region of the peripheral picture elements is suitably divided to adjust the total number of the RAMs shown in FIG. 9 to a suitable number.

Incidentally, FIG. 9 does not show circuitry required to write $S_{ij}$ from the CPU 140 to the RAM 131,132,133 because it can be readily achieved by known circuitry.

An application example of the method and apparatus of this invention will next be described.

In photomechanical processes, it is often practiced to take out only one portion (for example, man or car) of an original picture and then to print its duplicate image on an output film. This work is called "cutting-off" in photomechanical processes.

Owing to the recent advancement in the computerization of photomechanical processes, it has become possible to carry out economically, promptly and conveniently the work, which previously required lots of manpower and many films as intermediate media, through an operation which makes use of a computer-controlled color monitor. This system is called "layout scanner". When conducting "cutting-off" by means of this scanner, the desired image is called from a image data memory device in which data on original pictures are stored, such as a magnetic disk or the like, and is then displayed on a color monitor.

The operator traces the contour of a desired portion of the thus-displayed image by means of a light pen or digitizer provided as an accessory with the color monitor. By this operation, the closed contour is stored on a 1 bit memory plane in association with the picture elements displayed on the monitor.

The inside of the closed contour is thereafter painted out in accordance with the operator's instruction so that binary-coded data, in which the inside of the contour is identified by "1" and its outside is designated by "0", are prepared. Then, the contour data are applied to the original image so as to cut-off the original image data at the portion corresponding to the inside of the contour. In the above manner, the cutting-off of the original image can be performed along the thus-smoothened contour.

Similar operation is also required for a picture scanning and recording apparatus which performs the above-mentioned cutting-off at real time.

To display the cutted-off image on the monitor, pre-scanning is first of all conducted to establish correlation with the positions on an input cylinder. Under this situation, the image of the original picture is transferred to the display memory of the monitor so as to display it. Based on the displayed image, the operator performs cutting-off work in the same manner as he did with the layout scanner.

As a result, binary-coded image data corresponding to the displayed image are obtained in the same manner as that mentioned above. The inside of the contour is "1" while the outside of the contour is "0". When recording of an image is carried out on the basis of the data, the contour data is improved in resolution and a smoothened image is obtained at real time.

The above embodiments are also effective in recording oblique lines by facsimiles or in printing by means of dot printers.

The above embodiments can also be applied to display images which have been thinned out to shorten their processing time or to display images which have been obtained by coarse scanning. In this case, smoothening is effected including image portions which are not displayed.

Having now fully described the invention, it will be apparent to one of ordinary skill in the art that many changes and modifications can be made thereto without departing from the spirit or scope of the invention as set forth herein.

What is claimed is:

1. A method for processing binary-coded image data, including processing one of picture element data, which make up the binary-coded image data, in accordance with peripheral picture element data of said one picture element data and outputting the thus-processed picture element data as data on a plurality of sub-divided picture elements to an output unit, which comprises:
   (a) establishing a peripheral picture element region of a predetermined size around a target picture element which is to be processed, each picture element being assigned a logical "1" or "0" to represent the image data for that element;
   (b) establishing logical windows around corresponding sub-divided picture elements which have been obtained by sub-dividing the target picture element into n×n sub-elements, said logical windows having a preestablished size and falling within the peripheral picture element region, each said sub-element being located centrally within its associated logical window;
   (c) determining the areas of data regions having logical values "1" or "0" divided in accordance with the logical values in the respective logical windows for each sub-element of the target picture elements;
   (d) for each sub-element comparing the areas obtained in step (c) with a predetermined threshold value to obtain comparison results producing a logical "1" or "0" depending upon whether the area is greater than or less than the threshold value;
   (e) assigning the logical values produced in step (d) to the data of each of the sub-divided picture elements; and
   (f) outputting the data of step (e) on the above-processed sub-divided picture elements upon outputting data on the target picture element.

2. A method as set forth in claim 1 wherein the logical window has a size such that it extends beyond the target picture element in several directions by at least a plurality of adjacent picture elements.

3. A method as set forth in claim 1 wherein the logical window has a size of approximately n×n picture elements.

4. A method as set forth in claim 3 wherein n is greater than 2.

5. An apoparatus for smoothening binary-coded image data by processing one of picture element data, which make up the binary-coded image data, in accordance with peripheral picture element data of said one picture element data and outputting the thus-processed picture element data as data on a plurality of sub-divided picture elements to an ouptut unit, said apparatus including memory means capable of receiving data on a target picture element to be processed and data on peripheral picture elements around the target picture element for obtaining the data on the plurality of sub-divided picture elements, which comprises:
   means for establishing a peripheral picture element region of a predetermined size around the target picture element which is to be processed, establishing logical windows around corresponding sub-divided picture elements which have been obtained by dividing the target picture element into n×n sub-elements, said logical windows having a preestablished size and falling within the peripheral picture element region, dividing the picture element region of the predetermined size into a suitable number of blocks, and determining the areas of data regions having logical values "1" or "0" divided in accordance with the logical values in the respective logical windows in the respective blocks;
   means for storing the respective areas;
   means for adding the area when outputted from the storage means; and
   means for comparing the thus-added value with a predetermined value to obtain comparison results and giving predetermined logical values again to the data of the sub-divided picture elements located centrally in their corresponding logical windows in accordance with their corresponding comparison results,
   thereby processing all logical patterns, which the peripheral picture element region and the central picture element region may take, so as to output the sub-divided picture element data obtained from the means which is adapted to give the predetermined logical values.

* * * * *

UNITED STATES PATENT AND TRADEMARK OFFICE
CERTIFICATE OF CORRECTION

PATENT NO. : 4,771,471

DATED : September 13, 1988

INVENTOR(S) : Hideaki Kitamura

It is certified that error appears in the above-identified patent and that said Letters Patent is hereby corrected as shown below:

Column 3, line 47, change "image o" to --image on--.

Column 6, line 41, change "eac" to --each--.

Column 10, line 26, change "apoparatus" to --apparatus--.

Signed and Sealed this

Eleventh Day of August, 1992

Attest:

DOUGLAS B. COMER

*Attesting Officer*  *Acting Commissioner of Patents and Trademarks*